Patented Oct. 10, 1933

1,930,352

UNITED STATES PATENT OFFICE 1,930,352

PROCESS OF PREPARING 1.4-AMINOHYDROXYANTHRAQUINONE

Curt Bamberger, Wuppertal-Elberfeld, Germany, assignor to General Aniline Works, Inc., New York, N. Y., a corporation of Delaware No Drawing. Application October 21, 1931, Serial No. 570,262, and in Germany October 25, 1930

4 Claims. (Cl. 260—59)

The present invention relates to a process of preparing 1-amino-4-hydroxyanthraquinone.

The British specification No. 15 355/08 (Example 1) describes among others a "leuco derivative" of 1.4-diaminoanthraquinone, which is obtained by heating quinizarine with ammonia and sodium hydrosulfite under pressure. Detailed investigations have shown that this substance is not a true leuco compound, since it is stable to air and does not form immediately a readily oxidizable vat with cold caustic soda solution. The substance belongs rather to the class of reduction products designated as "hydro compounds" in the British specification No. 274,558.

The substance described in British specification No. 15 355/08 is, therefore, most probably to be designated as 1.4-diamino-2.3-dihydro-anthraquinone and must be formulated as follows:—

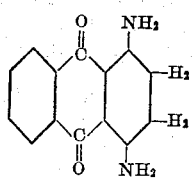

I have found that this 1.4-diamino-2.3-dihydro-anthraquinone can be transformed into 1-amino-4-hydroxyanthraquinone by treating it in sulfuric acid of about 50-85% strength with an oxidizing agent possessing oxidizing properties in sulfuric acid solution, said oxidizing agent being applied in an amount surmounting for at least 5% by weight the quantity necessary to remove two hydrogen atoms from the starting material. The temperature, at which reaction takes place varies in wide limits and is dependent to a far reaching extent on the strength of the sulfuric acid applied. The lower the concentration of the sulfuric acid, the lower is the temperature, at which reaction takes place. For example, when working with a sulfuric acid of 50-55% strength reaction will perform rather smoothly already at room temperature. With stronger sulfuric acids up to about 60-70% strength temperatures of about 15-20° C. are likewise operable, however, reaction only performs slowly in these cases and heating of the reaction mixture is, therefore, advantageous. When working with a sulfuric acid still stronger than about 70%, heating is necessary to bring about the desired result. There is no upper temperature limit besides that, at which decomposition of the anthraquinone derivatives occurs. Temperatures of about 200° C., for example, are still operable but unnecessary, since the reaction will perform at a temperature below about 100° C. in all cases. Generally, it will be necessary to add to the reaction mixture, after reaction is complete, a suitable reducing agent possessing reducing action in sulfuric acid solution, such as ferrous sulfate, stannous chloride etc. The addition of the reducing agent is unnecessary in case an oxidizing agent has been applied in an amount not substantially surmounting 5% by weight of the quantity theoretically necessary to remove two hydrogen atoms from the 1.4-diamino - 2.3 - dihydro - anthraquinone. Larger amounts of the oxidizing agent will work to transform part of the 1-amino-4-hydroxy-anthraquinone to its quinone imide of the probable formula:—

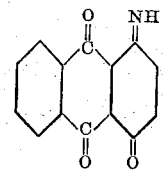

and it is the purpose of the reducing agent to reduce again this quinone imide to 1-amino-4-hydroxyanthraquinone. Therefore, it is obvious that the reducing agent should be used in an amount at least sufficient to quantitatively perform the reduction mentioned.

According to a preferred method of working the oxidizing agent is used in an amount surmounting for about 6-10% by weight the quantity, which is theoretically necessary to remove two hydrogen atoms from the 1.4-diamino-2.3-dihydro-anthraquinone used, while heating the reaction mixture to a temperature of between about 80-100° C. and while applying a sulfuric acid of about 60-70% strength.

It may be mentioned that the oxidizing agent may be applied in substantially larger amounts than given above. However, larger amounts will only work to form more of the quinone imide compound, without having any remarkable influence on the formation of 1-amino-4-hydroxyanthraquinone, and are, therefore, unnecessary.

As suitable oxidizing agents possessing oxidizing properties in sulfuric acid solution there may be mentioned by way of example, minium, vanadic acid, selenious acid, manganese dioxide, lead dioxide, persulfates, chromic acid, potassium ferric cyanide.

When working in the manner described 1-amino-4-hydroxy-anthraquinone is obtainable in a very convenient manner, in a good yield and in an excellent state of purity.

The following example illustrates my invention without, however, restricting it thereto:—

2,40 parts by weight of 1.4-diamino-2.3-dihydro-anthraquinone are dissolved in 40 parts by weight of 65% sulfuric acid and to this solution is added with thorough stirring at a temperature of 10-15° C. a suspension of 1.40 parts by weight of synthetic 67% pyrolusite (that is 108% of the quantity calculated for one molecule of manganese dioxide) in 30-40 parts by weight of 65% sulfuric acid. The mixture is then heated to 90-95° C. After the production of a transient dark coloration the melt soon becomes light in color, and at the same time the separation of the well crystallized sulfate of 1.4-aminohydroxyanthraquinone begins. When the quantity of the latter no longer shows a further increase, the reaction mixture is left to cool, the sulfate is filtered with suction and decomposed with water. Thus is obtained very pure 1.4-aminohydroxyanthraquinone in a yield of 82-85% of the theoretical amount.

When adding to the reaction mixture, after reaction is complete, a small amount of stannous chloride or another reducing agent possessing reducing properties in sulfuric acid solution, the yield of 1.4-aminohydroxyanthraquinone is still increased. According to another feature of the invention the working up of the reaction mixture may likewise be effected by pouring it into water containing some sulfurous acid or an alkali metal bisulfite, whereby likewise the small amounts of the quinone imide compound having formed are reduced to 1.4-aminohydroxyanthraquinone.

I claim:—

1. In the process of preparing 1-amino-4-hydroxyanthraquinone the step which comprises reacting upon 1.4-diamino-2.3-dihydro-anthraquinone in sulfuric acid of about 50-85% strength with an oxidizing agent possessing oxidizing properties in sulfuric acid solution at a temperature, which is adapted to the strength of the sulfuric acid applied, the oxidizing agent being used in an amount surmounting for at least 5% by weight the quantity theoretically necessary to remove two hydrogen atoms from the starting material.

2. In the process of preparing 1-amino-4-hydroxyanthraquinone the step which comprises reacting upon 1.4-diamino-2.3-dihydro-anthraquinone in sulfuric acid of between about 60-70% strength with manganese dioxide in an amount surmounting for about 6-10% by weight the quantity necessary to remove two hydrogen atoms from the starting material, at a temperature between about 80-100° C.

3. The process which comprises reacting upon 1.4-diamino-2.3-dihydro-anthraquinone in sulfuric acid of about 50-85% strength with an oxidizing agent possessing oxidizing properties in sulfuric acid solution at a temperature, which is adapted to the strength of the sulfuric acid applied, the oxidizing agent being used in an amount surmounting for at least 5% by weight the quantity theoretically necessary to remove two hydrogen atoms from the starting material, and treating the reaction product with a reducing agent possessing reducing action in sulfuric acid solution, in an amount at least sufficient to reduce all of the quinone imide compound having formed to 1-amino-4-hydroxyanthraquinone.

4. The process which comprises reacting upon 1.4-diamino-2.3-dihydro-anthraquinone in sulfuric acid of about 60-70% strength with manganese dioxide in an amount surmounting for about 6-10% by weight the quantity necessary to remove two hydrogen atoms from the starting material, at a temperature between about 80-100° C., and treating the reaction mixture with a reducing agent possessing reducing action in sulfuric acid solution, in an amount at least sufficient to reduce all of the quinone imide compound having formed to 1-amino-4-hydroxyanthraquinone.

CURT BAMBERGER.